United States Patent Office 3,449,291
Patented June 10, 1969

3,449,291
COLORED POLYMER POWDERS
Frank Lerman and Raymond C. Bartsch, Cincinnati, Ohio, assignors to National Distillers and Chemical Corporation, New York, N.Y., a corporation of Virginia
No Drawing. Filed June 15, 1966, Ser. No. 557,641
Int. Cl. C08f 47/04, 47/06; B44d 1/095
U.S. Cl. 260—41                                                19 Claims

ABSTRACT OF THE DISCLOSURE

A process for preparing colored spherical thermoplastic powders. The process comprises subjecting a mixture of a blend of colorant in a synthetic thermoplastic polymer and water to vigorous agitation in the presence of a block co-polymer of ethylene oxide and propylene oxide at a temperature above the melting point of the polymer and at elevated pressure in order to produce a fine dispersion. The dispersion is thereafter cooled to a temperature below the melting point of the polymer to thereby produce dispersed particles of the powder less than 1000 microns in diameter whereby the particles have colorant uniformly dispersed therein.

---

This invention relates to colored thermoplastic powders, and particularly to powders composed of individually colored fine spherical particles.

There is a growing need for finely-divided thermoplastic resins where it is either impossible or inconvenient to utilize the more conventional cube or pellet forms. Powdered organic polymeric thermoplastic resins are used in dry form to coat articles by dip coating in a stationary or in a fluidized bed, by powder coating wherein the powder is applied by spraying or dusting, by flame spraying, and by electrostatic attraction. Thermoplastic resin powders have been applied in dispersed form as coatings by roller coating, spray coating, slush coating, dip coating, and electrostatic coating to substrates such as metal, paper, paperboard, and the like. These powders have also been widely employed in conventional powder molding techniques; as paper pulp additives; as mold release agents for rubber; as additives to waxes, paints, and polishes; as binders for non-woven fabrics; and so forth.

A need has recently developed for colored thermoplastic powders, not only for such applications as described above, e.g., colored coatings for paper, textiles, and metals, but in addition for specialized purposes in research, e.g., as aerosol tracers in air dissemination studies; as particle simulants and standards for chemical, biological, radioactive, and aerodynamic research and development activities; as water suspended tracers in oceanography work; as signal powders; and the like.

The production of colored thermoplastics in general is not new. It is known that colored thermoplastic powders can be made by grinding coarse, colored thermoplastic cubes, pellets, etc., to the desired sizes. Such products, in varying particle sizes, can be made by incorporating pigments or dyes in a mixture or blend of resins which are subsequently passed through a high shear pulverizing device, e.g., a Pallmann Grinder, and then size-classified on a shaker screen, e.g., Orville Simpson Rotex Screener, or in an air classifier, e.g., a Majac Air Classifier. Grinding and size-classifying colored, bulk resin are expensive, requiring excessive power, close control, and special and expensive equipment. Even then, an appreciable part of the classified material is off-size and must be reprocessed, used for other purposes, or wasted. In addition, the particles thus produced are irregular and non-uniform in shape and are not entirely suitable for fluidization or dispersion applications wherein spherical particles of narrow size distribution are preferred.

The surface of the particles in thermoplastic powders can be coated with a coloring agent by conventional dyeing techniques. Dyeing thermoplastic particles by coating them on the outside is, however, a difficult procedure, and, unless special care is exercised, the coating is non-uniformly distributed and the material is tacky. Moreover, surface coatings of coloring agents are generally readily removed by natural friction and abrasion during powder flow or by solvents.

It is possible to prepare thermoplastic powders by dissolving the colored, bulk resin in a solvent, followed by precipitation of the polymer in finely-divided form by the addition of a non-solvent, by evaporation of the solvent, or by a combination of the two. Emulsifying agents are sometimes employed in this process to aid in particle break-down. Inherent in such processes are difficulties in manipulating the solvents, complete removal of the solvent from the product, removal of the coloring agent from the particles by the leaching action of the solvents employed, and size-classification of the resulting product. Also, the powders from such processes are of irregular, somewhat rounded shape and consequently possess only moderately satisfactory fluidization characteristics.

In addition to these difficulties encountered in the preparation of satisfactory, colored thermoplastic powders, there are also problems involved in the use of such colored powders prepared by known methods, for example, lack of uniformity of color distribution among and within the particles, uncontrolled loss of color from the surface of colored products by water or solvents, tackiness of the surface of the coated product, and so forth. The problems encountered in using colored thermoplastic powdered materials for coating, printing, dip-coating, pelletizing, and so forth are considerably reduced if the powder is non-tacky and consists of fine, spherical particles essentially uniform in size.

Ideally, the particles have consistent and stable physical, chemical, mechanical, electrostatic, and aerodynamic properties. It should be possible to readily modify, control, or standardize the properties of the patricles by selection of the polymeric material, colorant, other additives, processing media, and operating conditions. Through such controlled production, the subsequent classification for average particle size and size distribution could be minimized or even avoided. Uniformity of color distribution among and within the particles is a major advantage for overall color effects of the powder or of the products formed from it or in particle detection and quantitative determinations in dispersion and tracer studies. The spherical shape would contribute superior flow and fluidization characteristics, a shorter melting time, and improved dispersibility to the powders. Accordingly, it is an object of this invention to prepare colored finely-divided thermoplastic resins that meet such requirements.

A more particular object of this invention is to prepare colored finely-divided thermoplastic resins which are substantially of a given fine particle size and wherein the particles have a relatively narrow size range and are of spherical shape.

A still further object of this invention is to prepare compositions of discrete, uniformly colored, fine spherical particles of polymeric materials with special physical, chemical, electrostatic, and aerodynamic properties.

These and other objects are accomplished in general by forming blends of polymeric materials and coloring agents with or without other additives. The blend is introduced as coarsely subdivided solids or as a hot liquid extrudate together with a suitable dispersing agent into a vessel containing water. The mixture is heated to or at a temperature above the softening point of the polymer blend and is vigorously agitated to form finely-divided spherical particles dispersed in the liquid. This dispersion is then cooled rapidly, for example by venting the agitated vessel to reduce the pressure in it when the liquid medium is water or another volatile liquid operated under pressure. Then the cooled product is recovered, for example by filtration, washing, and drying.

The thermoplastic material suitable for the practice of this invention must have negligible or only slight solubility in water or other liquid medium used, and it must be capable of forming intimate, uniform mixtures with the coloring agent. It is also important that the polymeric material be immiscible in the liquid suspending-medium at the operating temperature. Although this invention will be described with reference to polyethylene, it is to be understood that the scope of the invention includes other olefin homopolymers and copolymers, polyamides, acrylic resins, polystyrene, cellulosics, polyesters, vinyl resins, fluorocarbons, and the like, and mixtures and copolymers of these. Specific examples of possible thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate, ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, styrene/methyl methacrylate, and so forth.

The coloring agent for use in the practice of this invention may be any suitable pigment, dye, opacifier, brighteners, and fluorescent agent, or the like. It must be heat-stable at the dispersion temperature of the polymeric material, should not react chemically with the polymeric material, and preferably should exhibit negligible or moderate solubility in water. Moreover, the colorant should preferably be light-stable and should not "bleed" or "migrate" from the thermoplastic resin after dispersion. Examples of suitable materials include carbon black, phthalocyanine blue, fluorescent coloring agents or dyes, phthalocyanine green, cadmium sulfide, cadmium sulfide selenide, titanium dioxide, calcined iron oxide, chromic oxide, zinc oxide, and the like.

Suitable surfactants in this invention are water-soluble block copolymers of ethylene oxide and propylene oxide. They are preferably water-soluble block copolymers of ethylene oxide and propylene oxide having a molecular weight above about 3500 and containing a major proportion by weight of ethylene oxide. Such compounds are both stable and effective as dispersing agents for thermoplastic polymers at temperatures ranging up to about 500° F. or higher, and more particularly at temperatures above about 280° F., especially temperatures in the range of about 280° F. to 400° F. Representative of such compounds are those prepared by polymerizing ethylene oxide on the ends of a preformed polymeric base of polyoxypropylene. Both the length and the molecular weight of the polyoxypropylene base and the polyoxyethylene end segments can be varied to yield a wide range of products. One example of a suitable surfactant is a polyoxypropylene of average molecular weight of 2700 polymerized weight ethylene oxide to give a product of molecular weight averaging about 13,500; it contains about 20 weight percent of propylene oxide and about 80 weight percent of ethylene oxide. Other effective agents include (a) 50 weight percent each of propylene oxide and ethylene oxide, molecular weight 6500; (b) 20 weight percent of propylene oxide and 80 weight percent of ethylene oxide, molecular weight 11,250; (c) 20 weight percent of propylene oxide and 80 weight percent of ethylene oxide, molecular weight 16,250; and (d) 50 weight percent each of propylene oxide and ethylene oxide, molecular weight 4500.

In the preferred embodiment of the practice of this invention, the coloring agent is incorporated into the polymeric material by combining said colorant with a finely-divided or granulated polymer in a mixing device such as a twin-cone blender and then mixing the two on a twin-roll mill, in a Banbury mixer, in a conventional screw extruder, or in other suitable equipment where the heat, either applied or generated by friction, is controlled to aid the blending of the agent into the polymer and at the same time to minimize polymer degradation. The blended material is then granulated or pelletized by conventional means.

The blend is subsequently contacted with water and the selected dispersing agent in any suitable dispersing apparatus. After heating and agitation, the system is cooled rapidly and the product is recovered, for example by filtration, washing, and drying.

The dispersing apparatus may be any device capable of delivering at least a moderate amount of shearing action to a liquid mixture under elevated temperatures and pressures. An example of suitable apparatus is a conventional autoclave equipped with conventional propeller stirrers. Propellers designed to impart greater shear to the mixture can affect the average particle size and size distribution of recovered polymer. The average particle size and size distribution of the powder product are influenced by the type of equipment, agitation time, stirring rate, and other operating and design factors. Higher stirring speeds generally result in finer and narrower dispersions until an optimum speed is reached. The stirring period at dispersion temperatures is generally from about 1 to 24 minutes at agitator tip speeds of from 400 to 4000 linear feet per minute, but preferably about 5 to 15 minutes at tip speeds of about 600 to 1000 linear feet per minute. The stirring rates and periods, however, depend upon the material processed and the type of equipment used.

The emulsifying agent need not be incorporated by milling or the like into the polymer in advance but may be introduced into the dispersing apparatus as a solid or as an aqueous solution simultaneously with the other ingredients. If desired, the dispersing process may be operated in a continuous manner.

The operating conditions, such as polymer concentration, ratio of surfactant to polymer, agitation tip-speed, agitation time, and operating temperature depend upon the type of polymer used, the type and concentration of the coloring agent, the surfactant type, the liquid medium selected, and the particle size distribution desired in the product.

The temperature of operation is dependent upon the melting point, melt flow properties, decomposition temperature, and desired fineness of dispersion of the selected synthetic organic thermoplastic resin. While such resins can be dispersed at temperatures as low as their respective melting points, increases in dispersion temperature beyond the melting point and up to the decomposition of the resins are generally accompanied by corresponding increases in the fluidity of the molten resin. As the fluidity of the melt increases, the dispersions are generally expected to develop lower average particle sizes without requiring increases in agitation effort, although frequently very fine particles have been produced at the lower temperatures.

In the specific embodiment of this invention for preparing polymer powders of very fine particle size, for example, homopolymers and copolymers of average particle size less than 10 microns, the dispersion temperature is at least 25° F. above the melting point of the polymer blend, and preferably is at least 60° F. above the melting point.

For the preferred polymers, dispersion temperatures range from about 230° F. to 500° F. As aforementioned, the use of lower temperatures, that is, down to the melting point of the polymer, will also yield dispersions, but often of a coarser particle size.

The pressure in the dispersion vessel is adjusted to exceed the vapor pressure of the liquid medium at the operating temperature (above the melting point of the polymer blend) so as to maintain a liquid phase. More particularly, the pressures may range from about 1 to 217 atmospheres, and preferably from about 6 to 120 atmospheres. In cases where the polymer is sensitive to air at the elevated dispersion temperatures, an inert gas, e.g., nitrogen or helium, may be substituted for the air normally present.

Drying of the recovered finely-divided polymer generally yields a free-flowing powder of fine particle size and relatively narrow particle size distribution. In general, the particles of a powder so produced are all less than about 1000 microns in diameter. By varying the composition of the selected dispersing agents, the ratio of polymer to water, and other material concentrations and operating conditions, powders can be made having average particle sizes ranging from about 300 microns to as low as 3 microns. Especially preferred are powders of narrow particle size distribution and average particle size less than 20 microns, and often desirably less than 10 microns.

The concentration of the coloring agent in a polyethylene/colorant composition can be within the range of about 0.1 to 80 weight percent. Usually the concentration range is between about 0.5 to 20 percent with a preferred range of 2 to 10 percent.

For water/polyethylene dispersions, about 1 to about 20 parts by weight of water are used per part of the resin/colorant, the preferred range being about 2.5 to about 10 parts. The ratio of the surfactant to the polymer/colorant blend in the reactor may range from about .10 to about 2.0 parts by weight of surfactant per part of polymer/colorant with a preferred range of about .20 to about 1.0 part.

The agitator speed in the dispersion vessel used in the following examples is in the range of about 400 to 4000 linear feet per minute, and the agitation time is in the range of about 1 to 24 minutes at the dispersion temperature.

By the practice of this invention there are obtained colored thermoplastic powders compositions consisting of discrete, spherical particles in which the coloring agent is uniformly dispersed. The particles have diameters in the range of 1 to about 1000 microns with an average particle diameter from about 3 to 300 microns size. These particles will provide standard spherical particles for research; in air dissemination studies; for use as simulants for chemical, biological, radioactive, aerosol dispersion, and oceanography tracer work; and for application as a signal powder. The product also can be used to provide colored, black, and opaque white coatings for paper and textiles, in dip-coating of heated metal parts, and as a colored or black toner or for a photoconductive coating in electrostatic printing processes. It can also be used to form colored, pressed pellets where it acts as a porous or solid binder for other material, and it is a satisfactory replacement for white finely-divided thermoplastics wherever a colored product is desired.

The nature and the amount of additive in the thermoplastic composition affect the physical properties of the final product. Since many types of thermoplastics can be used and since other additives, e.g., finely-divided copper, titanium dioxide, or blowing agents, can be incorporated in the polymer composition along with the coloring agent, it is possible to produce powders with special physical properties as to particle size, density, color, surface characteristics, aerodynamic and electrostatic properties, and so forth.

When materials, concentrations, and operating conditions normally conducive to producing unpigmented spherical polyethylene particles were applied to pigmented polyethylene, only large globules or fine to coarse fibers were produced. By modifying conditions, however, particularly by lowering the temperature and by using polyethylenes of higher melt index, powders consisting of fine spherical particles were consistently produced.

When mechanically-ground or irregularly-shaped particles of thermoplastic homopolymers or copolymers in the size range of about 0.25 inch down to about 10 microns, some containing pigments, some unpigmented, and others containing blowing agents and other additives, were processed in the same manner except that agitation was started simultaneously with heating and continued throughout the heating cycle, various-sized spherical particles were produced. The size depended primarily upon the type of polymer blend, the amount of surfactant, and the original size of the particle. Some, particularly the large irregular particles, were reduced to very fine spherical particles. The intermediate- and small-sized irregular particles, i.e., below about 500 microns, tended to retain their original size when spherized unless excessive surfactant was used, in which case reduction in particle size tended to occur. In other cases, particularly with blowing agent additives, finer particles tended to fuse into larger spherical particles to produce narrow size-distribution ranges. These results and the hypotheses developed to explain them can serve as a basis for controlling average size and size distribution of the particles of this process and this powder product.

The more detailed practice of the invention is illustrated by the following examples wherein parts are given by weight unless otherwise specified. These examples and embodiments are illustrative only, and the invention is not intended to be limited thereto except as indicated by the appended claims.

EXAMPLE I

Into a 2-liter Parr stirred reactor equipped with an electrically driven, single, 3-inch diameter, 6-blade turbine rotor was charged 138.5 grams of a polyethylene having a density of 0.917 g./cc., a melt index of 22, and containing 1 percent by weight of carbon black, 138.5 grams of a non-ionic surfactant, i.e., a block copolymer of ethylene oxide and propylene oxide sold under the trade name "Pluronic F–98" by Wyandotte Chemicals Corp., and 875 grams of water. The reactor was heated to 302° F. and vigorous agitation at 4000 r.p.m. applied for 12 minutes while the temperature was maintained at 302–314° F. The heating unit was removed and slow agitation continued while the reactor was allowed to cool to room temperature. The product was a black polyethylene powder uniformly colored and composed of spherical particles ranging in size between 10 and 1000 microns, average size 300 microns, as determined by microscopic counting of 100 particles at 430× magnifications.

EXAMPLE II

The procedure of Example I was repeated except that 168 grams of polyethylene having a density of 0.926 and melt index of 250 and containing 5 percent by weight of carbon black, 168 grams of Pluronic F–98, and 1000 grams of water were used. Ten minutes' agitation at 5100 r.p.m. was started when the temperature reached 280° F. During this agitation the temperature was maintained at 275–280° F. The product was a black polyethylene powder composed of spherical particles ranging in size between 10 and 1000 microns and averaging 100 microns.

EXAMPLE III

The procedure of Example I was repeated except that 138.5 grams of polyethylene containing 2 percent by weight of a fluorescent pigment (HI-VIZ Fluorescent B-3513 Red Orange sold by Lawter Chemicals, Inc.), 138.5 grams of Pluronic F-98, and 785 grams of water were used. Twelve minutes' agitation at 4000 r.p.m. was started when the temperature reached 325° F. During this agitation the temperature was maintained between 325° and 356° F. The product was a red polyethylene powder comprising spherical particles ranging in size between 3 and 50 microns and averaging 7 microns.

The following examples were performed in a stirred batch-reactor equipped with an air-driven turbine rotor.

The polymer blend, emulsifier, and water, a total weight of eight pounds, were charged to the reactor. The reactor was sealed and heat applied. When the temperature reached the desired level, agitation at the stated r.p.m. was started and maintained for the stated length of time while the temperature was maintained. The slurry in the reactor was then vented through a quick-opening ball valve in the bottom of the reactor into cold water. The cooled slurry was then filtered, washed, and air dried.

The following polyethylenes and coloring agents were used for these examples:

| Polyethylene Compound | Density | Melt Index |
|---|---|---|
| I | 0.915 | 22 |
| II | 0.926 | 250 |

| Color Agent | Supplier |
|---|---|
| III. Plasto Blue RDA BC 10194 | Allied Chemical Corp. |
| IV. Plasto Red B BC 10196 | Do. |
| V. Phthalocyanine Blue | Federal Color Laboratories. |
| VI. Titanium Dioxide | |
| VII. Vulcan 3 Carbon Black | Godfrey L. Cabot, Inc. |

The conditions are summarized in Table 1. The products were spherical colored polyethylene powders having particle sizes within the range of 2 to 200 microns.

TABLE 1

| Example | Polyethylene Compound | Lbs. | Color Agent Compound | Weight percent in Polyethylene | Emulsifier (Pluronic F-98), Lbs. | Reactor Temp., °F. | Agitation R.p.m. | Minutes |
|---|---|---|---|---|---|---|---|---|
| IV | I | 1.96 | III | 0.2 | 0.54 | 400 | 600 | 12 |
| V | I | 2.0 | III | 1.0 | 0.54 | 400 | 600 | 12 |
| VI | I | 2.0 | IV | 0.5 | 0.36 | 400 | 600 | 12 |
| VII | I | 1.0 | V | 0.5 | 1.26 | 400 | 900 | 12 |
| VIII | II | 2.0 | V | 0.5 | 0.54 | 300 | 1,300 | 12 |
| IX | II | 2.5 | V | 0.5 | 1.25 | 325 | 1,300 | 12 |
| X | II | 2.0 | V | 1.0 | 1.26 | 350 | 900 | 12 |
| XI | II | 0.5 | V | 0.5 | 0.67 | 300 | 900 | 12 |
| XII | II | 1 | VII | 5.0 | 1 | 300 | 800 | 6 |
| XIII | II | 1 | VII | 5.0 | 1.5 | 310 | 1,000 | 6 |
| XIV | II | 1 | VII | 5.0 | 1.0 | 325 | 1,000 | 12 |

EXAMPLES XV THROUGH XXIII

These are similar to Examples IV through XIV and are included to show the effect of some of the operating variables on average particle size (Number mean diameter or NMD) and particle size distribution (geometric standard deviation or GSD). These examples used polyethylene Compound II with 1.0 percent by weight of coloring agent Compound V and 2.4 percent by weight of coloring agent Compound VI incorporated therein. Particle size analysis was accomplished by microscopic counting of 100 particles at 430× magnifications. The conditions and results are summarized in Table 2.

TABLE 2

| Example | Polymer Charge, Lbs. | Emulsifier Pluronic F-98, Lbs. | Emulsifier to Polymer Ratio | Reactor Temp., °F. | Agitation R.p.m. | Minutes | Particle Size Analysis NMD | GSD |
|---|---|---|---|---|---|---|---|---|
| XV | 1.0 | 0.5 | 0.5 | 350 | 1,200 | 24 | 34.5 | 2.85 |
| XVI | 1.0 | 1.0 | 1.0 | 350 | 800 | 12 | 24.7 | 2.29 |
| XVII | 1.0 | 1.5 | 1.5 | 300 | 1,200 | 12 | 8.2 | 2.15 |
| XVIII | 1.0 | 1.0 | 1.0 | 325 | 1,200 | 6 | 18.2 | 2.35 |
| XIX | 1.0 | 1.5 | 1.5 | 350 | 1,000 | 6 | 15.9 | 2.14 |
| XX | 1.0 | 1.5 | 1.5 | 325 | 800 | 24 | 12.4 | 2.26 |
| XXI | 1.0 | 0.5 | 0.5 | 300 | 800 | 6 | 6.3 | 2.51 |
| XXII | 1.0 | 0.5 | 0.5 | 325 | 1,000 | 12 | 15.7 | 2.54 |
| XXIII | 1.0 | 1.0 | 1.0 | 300 | 1,000 | 24 | 8.6 | 2.17 |

A mathematical analysis of Examples XV through XXIII is given in following Table 3 and indicates the effect of some of the process variables on NMD and GSD.

TABLE 3

| Variable | NMD | GSD |
|---|---|---|
| Temperature, °F.: | | |
| 300 | 7.7 | 2.28 |
| 325 | 15.4 | 2.39 |
| 350 | 25.0 | 2.44 |
| R.p.m.: | | |
| 800 | 14.5 | 2.36 |
| 1,000 | 13.4 | 2.29 |
| 1,200 | 20.3 | 2.46 |
| Minutes Agitation: | | |
| 6 | 13.5 | 2.34 |
| 12 | 16.2 | 2.33 |
| 24 | 18.4 | 2.42 |
| Emulsifier to Polymer Ratio: | | |
| 0.5 | 15.5 | 2.64 |
| 1.0 | 17.2 | 2.27 |
| 1.5 | 12.2 | 2.18 |

EXAMPLE XXIV

The procedure of Example I was repeated except that 700 grams of water and 84 grams of xylene were used as the liquid medium. Eight minutes' agitation at 5400 r.p.m. was started when the temperature reached 280° F. and the temperature was maintained between 277° and 302° F. Polyethylene is soluble in xylene at this temperature. Since this procedure failed to produce a dispersion, the failure is attributed to the presence of the xylene.

EXAMPLE XXV

The procedure of Example I was repeated except that 168 grams of Pluronic F-98, 914.5 grams of water, 168 grams of an ethylene/vinyl acetate copolymer containing 14.2 percent of vinyl acetate and having a density of 0.938 g./cc. and a melt index of 7.0, and 1 percent of phthalocyanine blue were charged to the reactor. The reactor was heated to 325° F. and agitation at 800 r.p.m. was applied for 6 minutes. The slurry was vented through the discharge line, and the product was recovered by filtration, washing, and drying. The product was blue spherical particles 2 to 50 microns in size.

EXAMPLE XXVI

Into a baffled, 2-liter Parr stirred reactor equipped with three air-driven, 3-inch diameter, 6-blade turbine rotors was charged 914.5 grams of water, 90.5 grams of a non-ionic emulsifier (Pluronic F–98), and 335 grams of a copolymer of styrene/methyl methacrylate in a 2 to 1 mole ratio, ground to an average particle size of 15 microns and containing 10 percent by weight of carbon black. The reactor was sealed, and heat and agitation were started simultaneously. Agitation at 800 r.p.m. was maintained during the heating cycle and for an additional 6 minutes after the temperature had reached 350° F. The reactor was then vented into cold water through a ½-inch discharge line in the bottom of the reactor. The product was recovered by filtration, washing, and air drying. The product was black spherical particles 2 to 20 microns in size.

What is claimed is:

1. A process for preparing colored spherical thermoplastic powders which comprises subjecting a mixture of a blend of colorant in a synthetic thermoplastic polymer, and water to vigorous agitation in the presence of a block copolymer of ethylene oxide and propylene oxide at a temperature between the melting point and the decomposition point of the thermoplastic polymer and elevated pressure to produce a fine dispersion and thereafter cooling the dispersion to below the melting point of the polymer, to thereby produce dispersed particles of the powder less than 1000 microns in diameter having colorant uniformly dispersed therein.

2. The process of claim 1 wherein said thermoplastic is a polyolefin.

3. The process of claim 1 wherein said thermoplastic is a styrene/acrylate copolymer.

4. The process of claim 2 wherein said polyolefin is polyethylene.

5. The process of claim 2 wherein said polyolefin is an ethylene copolymer.

6. The process of claim 5 wherein said copolymer is an ethylene/vinyl acetate copolymer.

7. The process of claim 1 wherein the block copolymer of ethylene oxide and propylene oxide has a molecular weight above about 3500.

8. The process of claim 1 wherein the mixture is agitated at a temperature above about 230° F. and below the decomposition point of the thermoplastic polymer and at a pressure above about 1 atmosphere.

9. The process of claim 1 wherein the mixture is agitated at a temperature between about 230° and 500° F. and at a pressure between about 6 and 120 atmospheres.

10. The process of claim 1 wherein about 1 to about 20 parts by weight of water are used per part of the polymer/colorant mixture.

11. The process of claim 1 wherein about 2.5 to about 10 parts by weight of water are used per part of the polymer/colorant mixture.

12. The process of claim 1 wherein the amount of block copolymer is about 0.1 to about 2 parts by weight per part of the polymer/colorant mixture.

13. The process of claim 1 wherein the amount of block copolymer is between about 0.2 and 1 part by weight per part of the polymer/colorant mixture.

14. The process of claim 1 wherein the amount of colorant is within the range of about 0.1 to about 80 percent by weight of the polymer/colorant mixture.

15. The process of claim 1 wherein the amount of colorant is within the range of about 0.5 and 20 percent by weight of the polymer/colorant mixture.

16. The process of claim 1 wherein the thermoplastic polymer is in the form of coarsely-divided solids.

17. The process of claim 1 wherein the thermoplastic polymer is in the form of a molten extrudate.

18. The process of claim 1 wherein the thermoplastic polymer is in the form of powders of irregularly-shaped particles.

19. A process for preparing colored spherical thermoplastic powders which comprises subjecting a mixture of a blend of colorant in a synthetic thermoplastic polymer, and water to vigorous agitation in the presence of about 0.2 to 1 part by weight, based on the polymer/colorant mixture, of a block copolymer of ethylene oxide and propylene oxide having a molecular weight above about 3500 at a temperature within the range of about 230° to 500° F. and at a pressure between about 6 and 120 atmospheres to produce a fine dispersion and thereafter cooling the dispersion to below the melting point of the polymer to thereby form the dispersed particles having colorant uniformly dispersed therein, the water being present in an amount between about 2.5 and 10 parts by weight and the colorant being present in an amount between about 0.5 and 20 percent by weight, based on the polymer/colorant mixture; the thermoplastic polymer being present in a form selected from the group consisting of coarsely-divided solids, a molten extrudate, and powders of irregularly-shaped particles, and the dispersed particles of the powders so produced being less than 1,000 microns in diameter.

References Cited

UNITED STATES PATENTS

| Re. 25,136 | 3/1962 | Carlson | 252—62.1 |
| 2,844,486 | 7/1958 | Lamar | 106—308 |
| 3,079,342 | 2/1963 | Insalaco | 252—62.1 |
| 3,321,426 | 5/1967 | Dorsey | 260—28.5 |
| 3,326,848 | 6/1967 | Clemens | 260—41 |

OTHER REFERENCES

Organic Syntheses, call. vol. 4—Rabjohn (Ed.) (Wiley) (N.Y.) (1963) (Page 474).

MORRIS LIEBMAN, *Primary Examiner.*

H. H. FLETCHER, *Assistant Examiner.*

U.S. Cl. X.R.

106—308; 260—29.6, 34.2, 836